United States Patent
Yao et al.

(10) Patent No.: US 8,976,278 B2
(45) Date of Patent: Mar. 10, 2015

(54) DIGITAL DOMAIN ACCUMULATIVE CMOS-TDI IMAGE SENSOR WITH LOW POWER CONSUMPTION

(75) Inventors: Suying Yao, Tianjin (CN); Kaiming Nie, Tianjin (CN); Jiangtao Xu, Tianjin (CN); Jing Gao, Tianjin (CN); Zaifeng Shi, Tianjin (CN); Cen Gao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 13/882,181

(22) PCT Filed: May 31, 2012

(86) PCT No.: PCT/CN2012/076326
§ 371 (c)(1),
(2), (4) Date: Apr. 27, 2013

(87) PCT Pub. No.: WO2013/131329
PCT Pub. Date: Sep. 12, 2013

(65) Prior Publication Data
US 2014/0368703 A1 Dec. 18, 2014

(30) Foreign Application Priority Data
Mar. 5, 2012 (CN) .......................... 2012 1 0054725

(51) Int. Cl.
H04N 5/3745 (2011.01)
H04N 5/374 (2011.01)
H04N 5/378 (2011.01)

(52) U.S. Cl.
CPC ......... *H04N 5/37455* (2013.01); *H04N 5/3743* (2013.01); *H04N 5/378* (2013.01)
USPC .......................................... 348/295; 348/308

(58) Field of Classification Search
USPC ........................................................ 348/295
See application file for complete search history.

(56) References Cited

U.S. PATENT DOCUMENTS 6,445,464 B1 9/2002 Kishimoto
7,880,662 B2 * 2/2011 Bogaerts ....................... 341/169
(Continued)

FOREIGN PATENT DOCUMENTS

| CN | 101854489 A | 10/2010 |
| CN | 101883221 A | 11/2010 |
| CN | 102595068 B | 7/2012 |

OTHER PUBLICATIONS

Sang Meizhen etc., Design and Implementation of Timing Control for TDI CMOS Image Sensor, Dec. 2011 vol. 24, No. 12 pp. 1707-1711.
(Continued)

*Primary Examiner* — Kelly L Jerabek
*Assistant Examiner* — Abdelaaziz Tissire
(74) *Attorney, Agent, or Firm* — George G. Wang; Bei & Ocean (57) ABSTRACT

The present invention relates to the field of design of analog digital hybrid integrated circuit. The object of the invention is to reduce ADC conversion rate thus further reducing power consumption of the sensor while not reducing line frequency of the CMOS-TDI. To this end, a digital domain accumulative CMOS-TDI image sensor with low power consumption is provided. It includes a pixel array of n+k lines multiplied m columns, a column parallel signal pre-processing circuit, a column parallel successive approximation (SAR) ADC, a column parallel digital domain accumulator, a column parallel divider, a timing control circuit and an output shift register, wherein n+k+1 coarse quantification memory units are provided to the column parallel digital domain accumulator for storage of coarse quantification results; and memory units for storage of n times of fine quantification results are also provided, thus realizing n stages of TDI signal accumulation after accumulation of n times of fine quantification results. The invention is generally used in hybrid integrated circuit design.

2 Claims, 5 Drawing Sheets

(56) References Cited

U.S. PATENT DOCUMENTS

| | | | |
|---|---|---|---|
| 8,754,972 B2* | 6/2014 | Brown et al. | 348/295 |
| 2008/0079830 A1 | 4/2008 | Lepage | |
| 2011/0114823 A1* | 5/2011 | Katzir et al. | 250/208.1 |
| 2011/0291165 A1* | 12/2011 | Eckardt | 257/291 |
| 2014/0240562 A1* | 8/2014 | Brown et al. | 348/295 |

OTHER PUBLICATIONS

Gérald Lepage etc., Time-Delay-Integration Architechtures in CMOS Image Sensors, IEEE Transactions on Electron Devices, Nov. 2009, p. 2524-2533, vol. 56, No. 11.

Qu Hong song etc, Improvement of performance for CMOS area image sensors by TDI algorithm in digital domain, <<Optics and Precision Engineering>> vol. 8, No. 8, Aug. 2010.

Gao Jing etc., Realization and Optimization of Time Delay Integration in CMOS Image Sensors, <<Journal of Optoelectronics—Laser>>, vol. 18, No. 10, Oct. 2010.

Chen Zhong Jian etc., Study on test method of TDI function for infrared focal plane array COMS readout circuits, <<J. Infrared M illim. Waves>>, vol. 27, No. 5, Oct. 2008.

* cited by examiner

DIGITAL DOMAIN ACCUMULATIVE CMOS-TDI IMAGE SENSOR WITH LOW POWER CONSUMPTION

FIELD OF THE INVENTION

The present invention relates to the field of design of analog digital hybrid integrated circuit and more particularly, relates to a method of decreasing power consumption of digital domain accumulative CMOS-TDI image sensors and further relates to a digital domain accumulative CMOS-TDI image sensor with low power consumption.

BACKGROUND OF THE INVENTION

Figure 1:
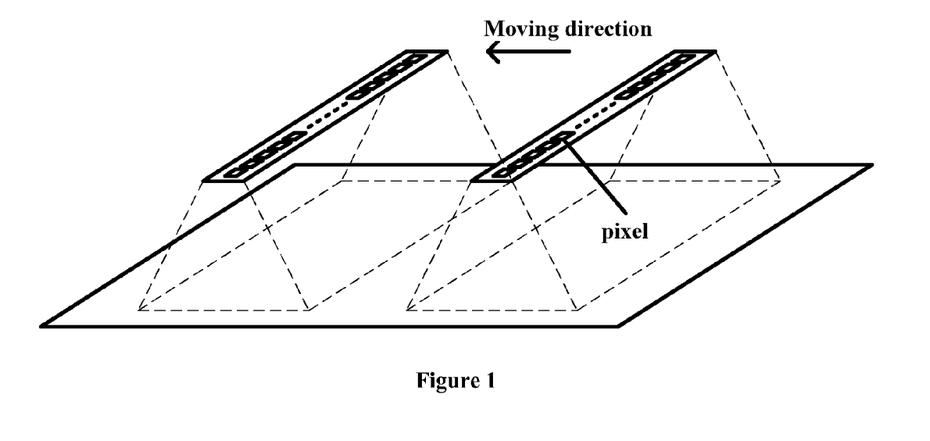
FIG. 1 shows a schematic view illustrating working mode of a prior art linear array image sensor.

An image sensor is capable of transforming optical signals captured by lens into electrical signals which may be easily stored, transferred and processed. The image sensor can be classified into area array type and linear array based on working principle. The area array image sensor works under the following principle: photos of an object are taken by a two-dimensional pixel array so as to obtain two-dimensional image information. The linear array image sensor works under the following principle: photos of an object are taken by scanning action of a single-dimensional pixel array to obtain two-dimensional image information. The working principle of the linear array image sensor is illustrated in FIG. 1. Due to special working manner, the linear array image sensors are extensively used in many technical fields such as aerial photography, space imaging, machine vision and medical imaging. However, as the object is moving continuously during pixel exposure of the linear array image sensor, the pixel exposure period is seriously limited by the moving speed of the sensor relative to the object being shot. In particular in environment where the relative moving speed is high and light intensity is weak (for example during process of space imaging), the linear array image sensor has very low Signal-to-Noise Ration (SNR). To improve SNR, time delay integration technology (TDI) is proposed which can improve SNR and sensitivity of the linear array image sensor. High SNR and sensitivity are realized by scanning the object many times in its special scanning method and accordingly, this technology is especially suitable to the environment where speed is high and light intensity is weak. Based on TDI, the pixel array in an area arrangement performs linear scanning to the object and therefore, the same moving object is scanned many times by pixels of different lines. Scanning of different lines of pixels is accumulated and as a result, the object integration exposure time by the pixel is effectively extended. Consequently, SNR and sensitivity can be enhanced significantly.

Figure 2:
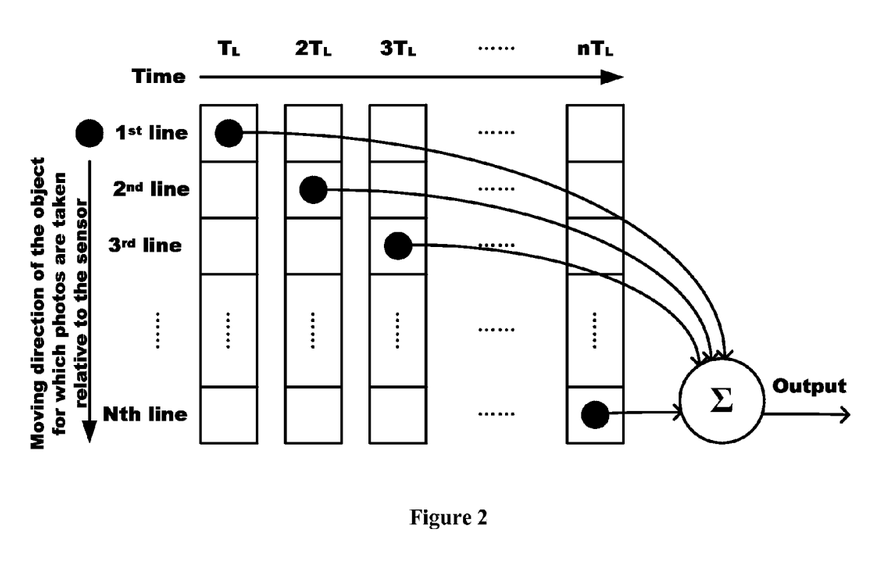
FIG. 2 shows a schematic view illustrating working mode of a prior art CCD-TDI image sensor.

At earlier time, TDI technology is realized by charge coupled device (CCD) image sensor. CCD image sensor is also an ideal device for realizing the TDI because CCD can realize signal accumulation without any noise. Currently, TDI is widely used in CCD image sensors. A commonly used CCD-TDI image sensor is similar in construction to an area array CCD image sensor but works in a line scanning manner. As shown in FIG. 2, A CCD-TDI image sensor operates as follows. There are n lines of pixels for a n-stage CCD-TDI image sensor. The charge obtained by a first line of pixels located at certain column during a first exposure period is not directly outputted. Rather, it is added to the charge obtained by the second line of pixels located at the same column during the second exposure period. In a similar manner, the charges captured by the last line of pixels (that is, the $n^{th}$ line of pixels) of the CCD-TDI image sensor is added to the charges accumulated during n−1 times and then are read out as a usual linear array CCD device does. For a CCD-TDI image sensor, the amplitude of the outputted signals is the sum of n pixel integration charges, namely, the charges obtained during n times of pixel exposure. As a result, the amplitude of the outputted signals is increased by n times, while the amplitude of noise is increased only by by $\sqrt{n}$ times. Accordingly, SNR can be improved by $\sqrt{n}$ times.

CCD image sensors presently used in many technical fields however, have been gradually replaced by CMOS (Complementary Metal Oxide Semiconductor) image sensors due to disadvantages such as large power consumption and low integration. Among various prior art technologies, it has been proposed to incorporate analog signal accumulator into the CMOS image sensor in order to realize TDI. Specifically, analog signals outputted by pixels are inputted into the analog signal accumulator to perform accumulation of the same exposure signals. After that, accumulated analog signals are transferred to an ADC and are processed by the ADC such that these signals are outputted quantitatively. This method of realizing CMOS-TDI image sensor by accumulation of analog signals however will consume much power and result in large chip size. In addition, great noise may also be introduced by the analog signal accumulator itself during accumulation of analog signals, thus leading to much difficulty in forming higher TDI stage. Comparatively, realization of CMOS-TDI image sensor using digital domain signal accumulation will substantively decrease the power consumption of chip and also reduce the size of the chip thus obtaining higher TDI stage. In a digital domain signal accumulation process, the signals outputted by the pixels are at first sent to the ADC where the signals are quantified and then the quantified digital signals are inputted into the digital domain accumulator to perform accumulation of the same exposure signals. At last, the accumulated signals are outputted directly. However, for the prior art technology, it is required that ADC with high conversion speed to obtain digital domain accumulated CMOS-TDI image sensor with high line frequency. Therefore, it is very difficult to reduce power consumption of the CMOS-TDI image sensor when realizing high line frequency.

SUMMARY OF THE INVENTION

The object of the present invention is to overcome the drawback of prior art and reduce ADC conversion rate thus further reducing power consumption of the sensor while not reducing line frequency of the CMOS-TDI image sensor. To this end, a digital domain accumulative CMOS-TDI image sensor with low power consumption is provided. It includes a pixel array of n+k lines multiplied m columns, a column parallel signal pre-processing circuit, a column parallel successive approximation (SAR) ADC, a column parallel digital domain accumulator, a column parallel divider, a timing control circuit and an output shift register, wherein n+k+1 coarse quantification memory units are provided to the column parallel digital domain accumulator for storage of coarse quantification results; and memory units for storage of n times of fine quantification results are also provided, thus realizing n stages of TDI signal accumulation after accumulation of n times of fine quantification results.

The coarse quantification memory units, memory units for storage of n times of fine quantification results and the column parallel digital domain accumulator further comprise a digital adder, a multiplexer, a memory array A, a memory array B, an one-way bus 1, a two-way bus 2, a two-way bus 3, a two-way bus 4 and an one-way bus 5; the memory array A functions to store fine quantification results therein, while the memory array B functions to store coarse quantification results therein; an output end of the SAR ADC is connected to an input end of the digital adder via the one-way bus 1; an output end and another input end of the digital adder are connected to the multiplexer through the two-way bus 2; a channel B of the multiplexer is connected with the memory array B through the two-way bus 3; channel A of the multiplexer is connected with the memory array A through the two-way bus 4; and the memory array B is connected with a DAC of the SAR ADC via the one-way bus 5.

The connection and timing control among these coarse quantification memory units, memory units for storage of n times of fine quantification results and the the column parallel digital domain accumulator are: the image sensor has original n lines of pixels and newly added k lines of pixels, and k lines of pixels added when the image sensor begins to work perform in advance exposure to appeared object A for k times; the output results of P1$^{th}$ line of pixels are coarsely quantified by the column parallel SAR ADC and then are stored into the memory array B of the digital adder (it is supposed herein that the results are stored into N$^{th}$ memory, i.e., a memory Bn); after that, results produced by performing exposure to the same object A by the P2$^{th}$ line of pixels are coarsely quantified by the SAR ADC and the resultant digital signals are transferred to the input end of the digital adder via the bus 1; the data stored in the memory Bn is delivered to another input end of the digital adder via the bus 3 and the multiplexer and further via the bus 2; finally, the output results of the digital adder are returned back to the memory Bn through the bus 2, multiplexer and bus 3; by the same token, signals outputted by preceding k lines of pixels are accumulated and then stored into the memory Bn; during fine quantification period of the SAR ADC, after the first line of pixels finishes exposure to the object A, the signals outputted by the first line of pixels are delivered to a positive input end of a comparator of the SAR ADC; at the same time, data stored in the memory Bn is averaged by dividing it by k and resultant average value is sent to the DAC of the SAR ADC through the bus 5; in this way, on the basis of coarse quantification results, the SAR ADC further performs successive approximation to inputted analog signals so as to perform fine quantification; as such, the output results of the SAR ADC are entire quantification results of the present exposure signals and the quantification results are stored into the memory An; in a similar manner, the signals in the memory An are accumulated n times and then outputted; the output results of the accumulator are transferred to a divider so as to restore digit-bandwidth of the signals and finally, signals of all columns are outputted in serial by the shift register.

The present invention has the following advantages.

K lines of pixels are additionally added into the original pixel array. The exposure results of the same object A produced by the k lines of pixels may be coarsely quantified for k times by the SAR ADC. The average value of k times of coarse quantification is used as the result of quantification so as to reduce risk of coarse quantification. In case that the SAR ADC with x bits is used, successive approximation should be performed x times for a prior art technique to finish quantification of x bits for the inputted signals. In case that the quantification method of the present invention is used, successive approximation may be performed x/2 times during a coarse quantification period and successive approximation may be further performed x/2 times during a fine quantification period. After the original pixel array finishes exposure to the object A, the pixel output signals can be further quantified on the basis of coarse quantification. Therefore, for the same readout time, successive approximation times of the SAR ADC may be reduced by half. Resultantly, conversion rate of the SAR ADC may be decreased by half while keeping the readout time unchanged, thus further decreasing power consumption of the entire chip.

DETAILED DESCRIPTION OF THE INVENTION

Figure 3:
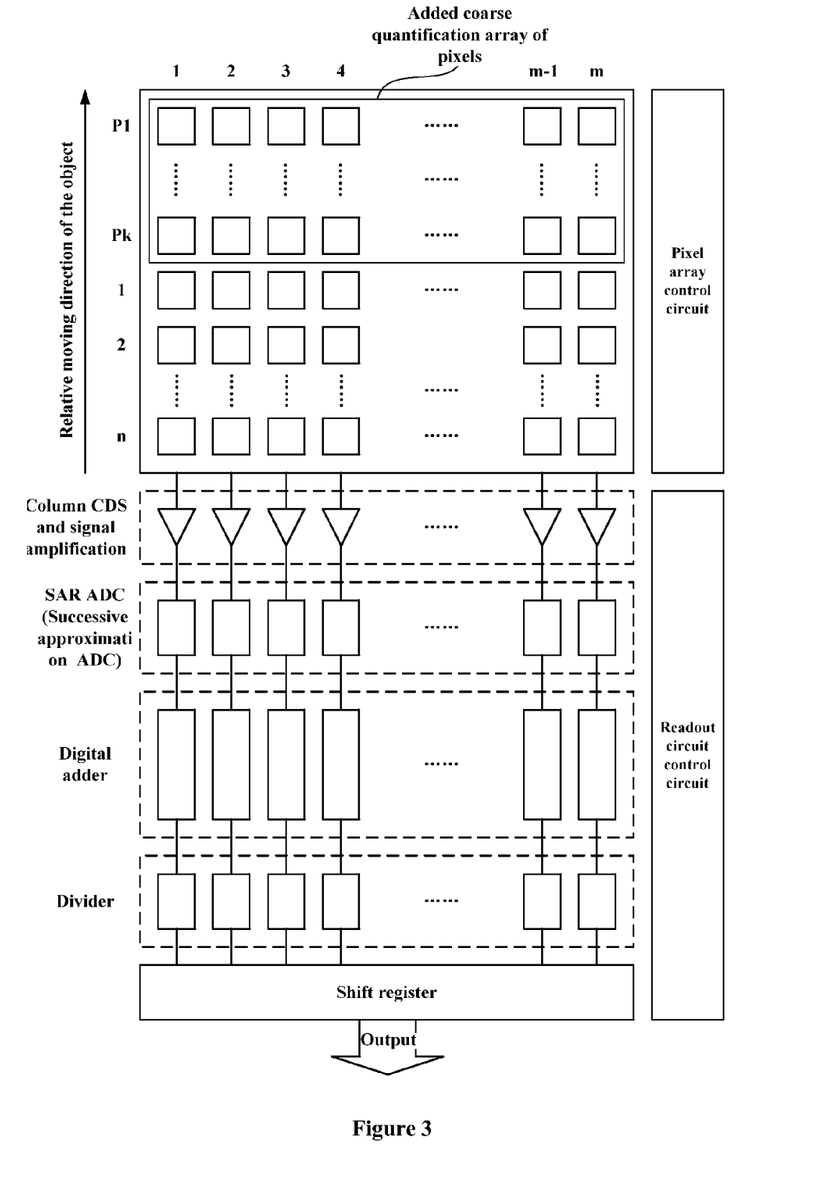
FIG. 3 shows a circuit diagram of a CMOS-TDI image sensor according to the invention.

K lines of pre-processing pixels (P1–Pk) are added into an n×m pixel array (n lines and m columns). The newly added k lines of pre-processing pixels are located to face a direction along which the original pixel array moves towards the object. The detailed construction of the sensor is shown in FIG. 3. The digital domain accumulative CMOS-TDI image sensor mainly includes a pixel array of (n+k)×m ((n+k) lines and m columns), a column parallel signal pre-processing circuit (CDS and signal amplification), a column parallel SAR ADC (successive approximation ADC), a column parallel digital domain accumulator, a column parallel divider, a timing control circuit and an output shift register. In the prior art, attempt has been made in order to achieve that the CMOS-TDI will perform exposure to the same object synchronously by temporal over-sampling method. The rolling shutter exposure with over-sampling rate of (n+k+1)/(n+k) has also been applied to the digital domain accumulative CMOS-TDI image sensor to ensure that pixels of different lines will perform exposure to the same object synchronously with the newly added k lines of pixels. By rolling shutter exposure with over-sampling rate of (n+k+1)/(n+k), it is meant that during an exposure period exposure is performed successively from the first line of pixels to the (n+k)$^{th}$ line of pixels and after that, exposure is performed for an additional time for the first line of pixels. In this way, (n+k+1) data will be outputted by (n+k) lines of pixels during an exposure period and as a result, (n+k+1) stages of memory units should be provided for the digital domain accumulator. To simplify timing control of the memory units, coarse and fine quantification results produced by exposure to the same object are respectively stored into the coarse and fine memory units of the same stage. Accordingly, (n+k+1) stages of coarse and fine memory units are required.

The TDI image sensor features that the same object successively passes through each line of pixels of the image sensor so as to be exposed. As a result, signals outputted after exposure are performed to the same object will occur repeatedly and finally, these signals are accumulated to improve SNR of the image sensor. As these signals are produced as a result of performing exposure to the same object, these signals are substantially equivalent in the amplitude of voltage. The slight difference among these signals is resulted from noise. Therefore, exposure can be performed by newly added k lines of pixels for k times. Consequently, k times of coarse quantification may be performed to k exposure output signals using SAR ADC (successive approximation ADC) presented in prior art technique. Then, the average value of k times of coarse quantification is used as the result of quantification so as to reduce risk of coarse quantification. Next, n times of fine quantification may be performed based on the coarse quantification after the exposure of the original pixel array. The results of n times of fine quantification are accumulated and outputted, thus finishing n stages of TDI signal accumulation. In case that the SAR ADC with x bits is used, successive approximation should be performed x times for a prior art technique to finish quantification of x bits for the inputted signals. In case that the quantification method of the invention is used, successive approximation may be performed x/2 times during a coarse quantification period and successive approximation may be further performed x/2 times during a fine quantification period. Therefore, for the same readout time, successive approximation times of the SAR ADC may be reduced by half. Resultantly, conversion rate of the SAR ADC may be decreased by half while keeping the readout time unchanged.

Figure 4:
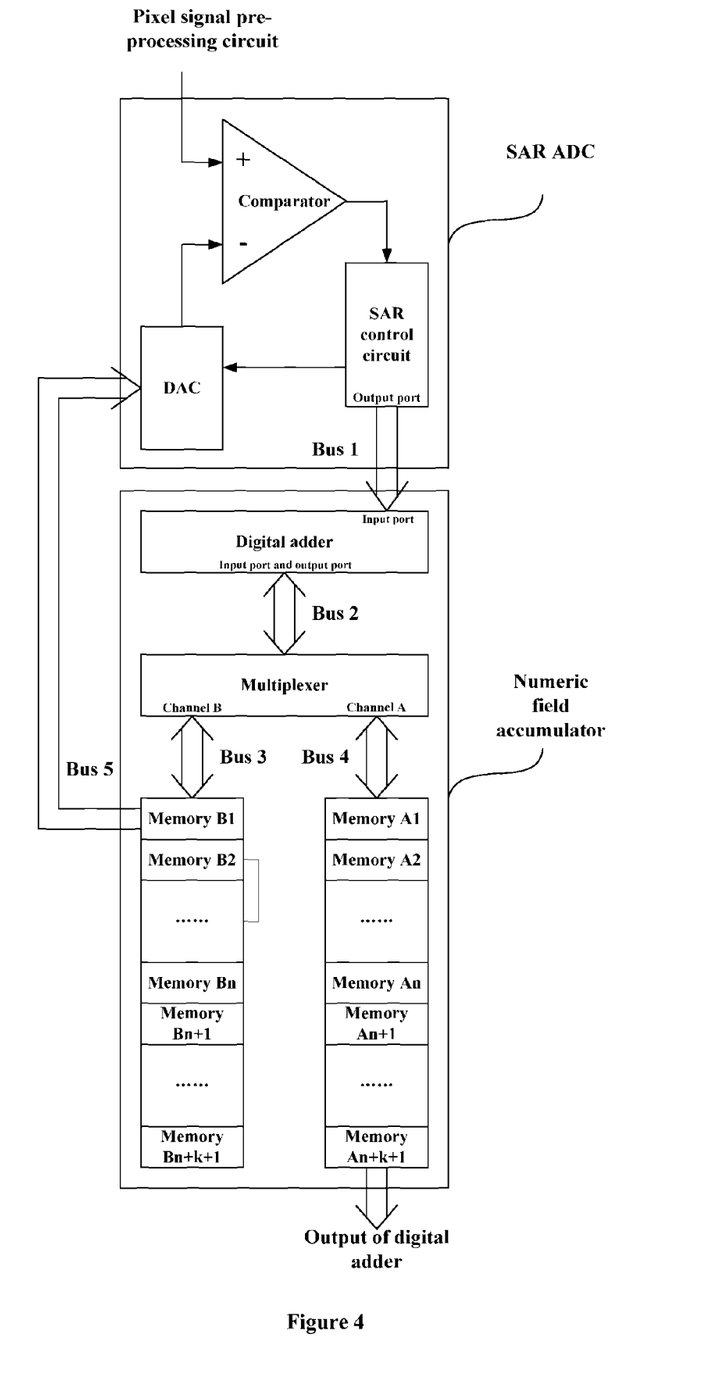
FIG. 4 shows a block diagram of a digital domain accumulator according to the invention.

As result of each approximation of the SAR ADC may be stored as digital signal and be restored, the coarse quantification results of the SAR ADC may be stored with ease into a digital memory. As a result, it is needed to provide additional (n+k+1) coarse quantification memory units for the digital domain accumulator. The detailed construction of the SAR ADC and digital domain accumulator presented by the invention is shown in FIG. 4. As shown in FIG. 4, it is mainly composed of a SAR ADC, a digital adder, a multiplexer, a memory array A (A1–An+k+1), a memory array B (B1–Bn+k+1), an one-way bus 1, a two-way bus 2, a two-way bus 3, a two-way bus 4 and an one-way bus 5. The memory array A functions to store fine quantification results therein, while the memory array B functions to store coarse quantification results therein. An output end of the SAR ADC is connected to an input end of the digital adder via the one-way bus 1; an output end and another input end of the digital adder are connected to the multiplexer through the two-way bus 2; a channel B of the multiplexer is connected with the memory array B through the two-way bus 3; channel A of the multiplexer is connected with the memory array A through the two-way bus 4; and the memory array B is connected with a DAC of the SAR ADC via the one-way bus 5. The detailed operation of it is described as follows. The K lines of pixels (P1–Pk) added when the image sensor begins to work performs in advance exposure to appeared object A for k times. The output results of P1$^{th}$ line of pixels are coarsely quantified by the column parallel SAR ADC and then are stored into the memory array B of the digital adder (it is supposed herein that the results are stored into n$^{th}$ memory, i.e., a memory Bn). After that, results produced by performing exposure to the same object A by the P2$^{th}$ line of pixels are coarsely quantified by the SAR ADC and the resultant digital signals are transferred to the input end of the digital adder via the bus 1. The data stored in the memory Bn is delivered to another input end of the digital adder via the bus 3 and the multiplexer and further via the bus 2. Finally, the output results of the digital adder are returned back to the memory Bn through the bus 2, multiplexer and bus 3. By the same token, signals outputted by preceding k lines of pixels are accumulated and then stored into the memory Bn. During fine quantification period of the SAR ADC, after the first line of pixels finishes exposure to the object A, the signals outputted by the first line of pixels are delivered to a positive input end of a comparator of the SAR ADC. At the same time, data stored in the memory Bn is averaged by dividing it by k and resultant average value is sent to the DAC of the SAR ADC through the bus 5. In this way, on the basis of coarse quantification results, the SAR ADC further performs successive approximation to inputted analog signals so as to perform fine quantification. As such, the output results of the SAR ADC are entire quantification results of the present exposure signals and the quantification results are stored into the memory An. In a similar manner, the signals in the memory An are accumulated n times and then outputted. The output results of the accumulator are transferred to a divider so as to restore the bit width of the signals and finally, signals of all columns are outputted in serial by the shift register.

Figure 5:
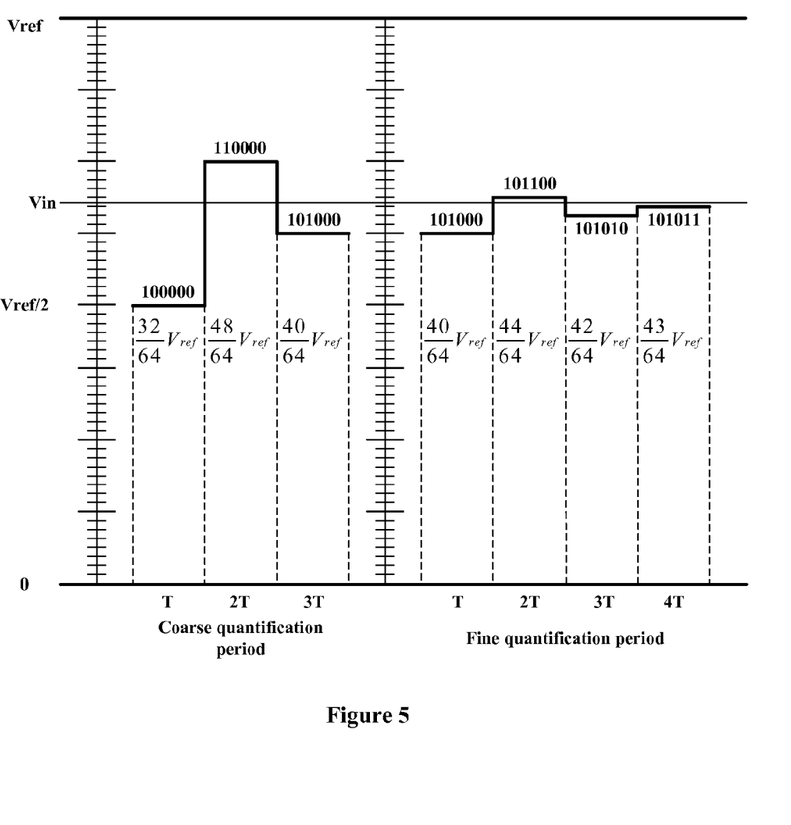
FIG. 5 shows a flow diagram illustrating working principle of a SAR ADC according to the invention.

To better understand the objects, technical solution and technical effects of the invention, the detailed embodiments of the invention are explained below. At first, a 6-bit SAR ADC with a full scale Vref is taken as an example to explain the coarse and fine quantification processes. The quantification process is illustrated in FIG. 5. As shown in FIG. 5, during a coarse quantification process, successive approximation is performed for 3 times and then the coarse quantification results are stored. In a fine quantification process, on the basis of the coarse quantification results, the SAR ADC performs further successive approximation for 4 times, thereby finishing quantification of the input signals with the accuracy of 6 bits. Therefore, the duration in which fine quantification is performed by the SAR ADC is only half of the original quantification time.

The present invention is further discussed in conjunction with an example of CMOS-TDI image sensor. The CMOS-TDI image sensor has a pixel array of 128 (lines)×1024 (columns) and the size of each pixel is 15 m×15 m. In case that double layout side readout is employed (that is, in the circuit layout, upper side and bottom side of the pixel array each have 512 readout circuits disposed thereon), the layout width of each column of readout circuits is 30 m. The column parallel ADC is a SAR ADC of 10 bits. To obtain line frequency of 8K by accumulation of 128 stages and in case that a conventional working manner is applied, the sensor need a SAR ADC with frequency of 1 MHz. In other words, successive approximation must be performed 10 times in 1 μs, meaning that each approximation will take 100 ns. Comparatively, when working manner of the present invention is employed and both coarse and fine quantification is assigned with 5 bits, successive approximation should only be performed by the SAR ADC 5 times in 1 μs thus realizing line frequency of 8K. In other words, each time of approximation will only take 200 ns. Therefore, conversion rate of the SAR ADC may be reduced to 500 KHz from 1 MHz. As a result, the power consumption of the SAR ADC can be reduced by half.

The invention claimed is:
1. A digital domain accumulative CMOS-TDI image sensor with low power consumption, comprising a pixel array of n+k lines multiplied m columns, a column parallel signal pre-processing circuit, a column parallel successive approximation (SAR) ADC, a column parallel digital domain accumulator, a column parallel divider, a timing control circuit and an output shift register, wherein n+k+1 coarse quantification memory units are provided to the column parallel digital domain accumulator for storage of coarse quantification results; and memory units for storage of n times of fine quantification results are also provided, thus realizing n stages of TDI signal accumulation after accumulation of n times of fine quantification results; K lines of pre-processing pixels are added into an n×m pixel array (n lines and m columns), the newly added k lines of pre-processing pixels are located to face a direction along which the original pixel array moves towards the object; the coarse quantification memory units, memory units for storage of n times of fine quantification results and the column parallel digital domain accumulator comprise a digital adder, a multiplexer, a memory array A, a memory array B, an one-way bus 1, a two-way bus 2, a two-way bus 3, a two-way bus 4 and an one-way bus 5; the memory array A functions to store fine quantification results therein, while the memory array B functions to store coarse quantification results therein; an output end of the SAR ADC is connected to an input end of the digital adder via the one-way bus 1; an output end of the digital adder and another input end of the digital adder are connected to the multiplexer through the two-way bus 2; a channel B of the multiplexer is connected with the memory array B through the two-way bus 3; a channel A of the multiplexer is connected with the memory array A through the two-way bus 4; and the memory array B is connected with a DAC of the SAR ADC via the one-way bus 5.

2. The sensor as recited in claim 1, wherein the connection and timing control among these coarse quantification memory units, memory units for storage of n times of fine quantification results and the column parallel digital domain accumulator are: the image sensor has original n lines of pixels and newly added k lines of pixels and k lines of pixels added when the image sensor begins to work perform in advance exposure to appeared object A for k times; the output results of P1th line of pixels are coarsely quantified by the column parallel SAR ADC and then are stored into the memory Bn of memory array B of the digital adder; after that, results produced by performing exposure to the same object A by the P2th line of pixels are coarsely quantified by the SAR ADC and the resultant digital signals are transferred to the input end of the digital adder via the bus 1; the data stored in the memory Bn is delivered to another input end of the digital adder via the bus 3 and the multiplexer and further via the bus 2; finally, the output results of the digital adder are returned back to the memory Bn through the bus 2, multiplexer and bus 3; by the same token, signals outputted by preceding k lines of pixels are accumulated and then stored into the memory Bn; during fine quantification period of the SAR ADC, after the first line of pixels finishes exposure to the object A, the signals outputted by the first line of pixels are delivered to a positive input end of a comparator of the SAR ADC; at the same time, data stored in the memory Bn is averaged by dividing it by k and resultant average value is sent to the DAC of the SAR ADC through the bus 5; in this way, on the basis of coarse quantification results, the SAR ADC further performs successive approximation to inputted analog signals so as to perform fine quantification; As such, the output results of the SAR ADC are entire quantification results of the present exposure signals and the quantification results are stored into the memory An; in a similar manner, the signals in the memory An are accumulated n times and then outputted; the output results of the accumulator are transferred to a divider so as to restore digit-bandwidth of the signals and finally, signals of all columns are outputted in serial by the shift register.

* * * * *